United States Patent
Waku et al.

(10) Patent No.: US 8,589,636 B2
(45) Date of Patent: Nov. 19, 2013

(54) CACHE MEMORY DEVICE, PROCESSOR, AND PROCESSING METHOD

(75) Inventors: Akihiro Waku, Kawasaki (JP); Naoya Ishimura, Kawasaki (JP); Hiroyuki Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 635 days.

(21) Appl. No.: 12/801,869

(22) Filed: Jun. 29, 2010

(65) Prior Publication Data

US 2010/0332758 A1  Dec. 30, 2010

(30) Foreign Application Priority Data

Jun. 29, 2009  (JP) .................... 2009-154372

(51) Int. Cl.
*G06F 12/00* (2006.01)
(52) U.S. Cl.
USPC .......................................................... 711/154
(58) Field of Classification Search
None
See application file for complete search history.

(56) References Cited

U.S. PATENT DOCUMENTS

| | | | |
|---|---|---|---|
| 5,706,465 A | 1/1998 | Kurokawa et al. | |
| 6,360,298 B1 | 3/2002 | Osanai et al. | |
| 7,418,551 B2 * | 8/2008 | DeVale et al. | 711/118 |
| 2007/0283100 A1 | 12/2007 | Asano et al. | |

FOREIGN PATENT DOCUMENTS

| | | |
|---|---|---|
| JP | 63-20640 | 1/1988 |
| JP | 2001-222468 | 8/2001 |
| JP | 2004-246636 | 9/2004 |
| JP | 2007-164433 | 6/2007 |
| JP | 2007-323192 | 12/2007 |
| JP | 2008-40650 | 2/2008 |

OTHER PUBLICATIONS

European Search Report mailed Nov. 5, 2010 in corresponding European Patent Application 10167677.3.
Japanese Office Action mailed Jul. 23, 2013 in corresponding Japanese Application No. 2009-154372.

* cited by examiner

*Primary Examiner* — Brian Peugh
(74) *Attorney, Agent, or Firm* — Staas & Halsey LLP (57) ABSTRACT

A cache memory device includes: a data memory storing data written by an arithmetic processing unit; a connecting unit connecting an input path from the arithmetic processing unit to the data memory and an output path from the data memory to a main storage unit; a selecting unit provided on the output path to select data from the data memory or data from the arithmetic processing unit via the connecting unit, and to transfer the selected data to the output path; and a control unit controlling the selecting unit such that the data from the data memory is transferred to the output path when the data is written from the data memory to the main storage unit, and such that the data is transferred to the output path via the connecting unit when the data is written from the arithmetic processing unit to the main storage unit.

12 Claims, 7 Drawing Sheets

CACHE MEMORY DEVICE, PROCESSOR, AND PROCESSING METHOD

CROSS-REFERENCE TO RELATED APPLICATION(S)

This application is based upon and claims the benefit of priority of the prior Japanese Patent Application No. 2009-154372, filed on Jun. 29, 2009, the entire contents of which are incorporated herein by reference.

FIELD

The embodiments discussed herein are directed to a cache memory device, a processor, and a processing method.

BACKGROUND

Recent arithmetic processing apparatuses that include processor cores, such as a CPU, are generally provided with cache memories to increase processing speeds. A cache memory is provided between a main storage unit, such as a main memory, and a processor core and temporarily stores data that the processor core frequently uses. When executing arithmetic processing, the processor core reads the data from the cache memory, which is closer to the processor core than to the main memory, so that the time required for memory access can be shortened.

Figure 7:
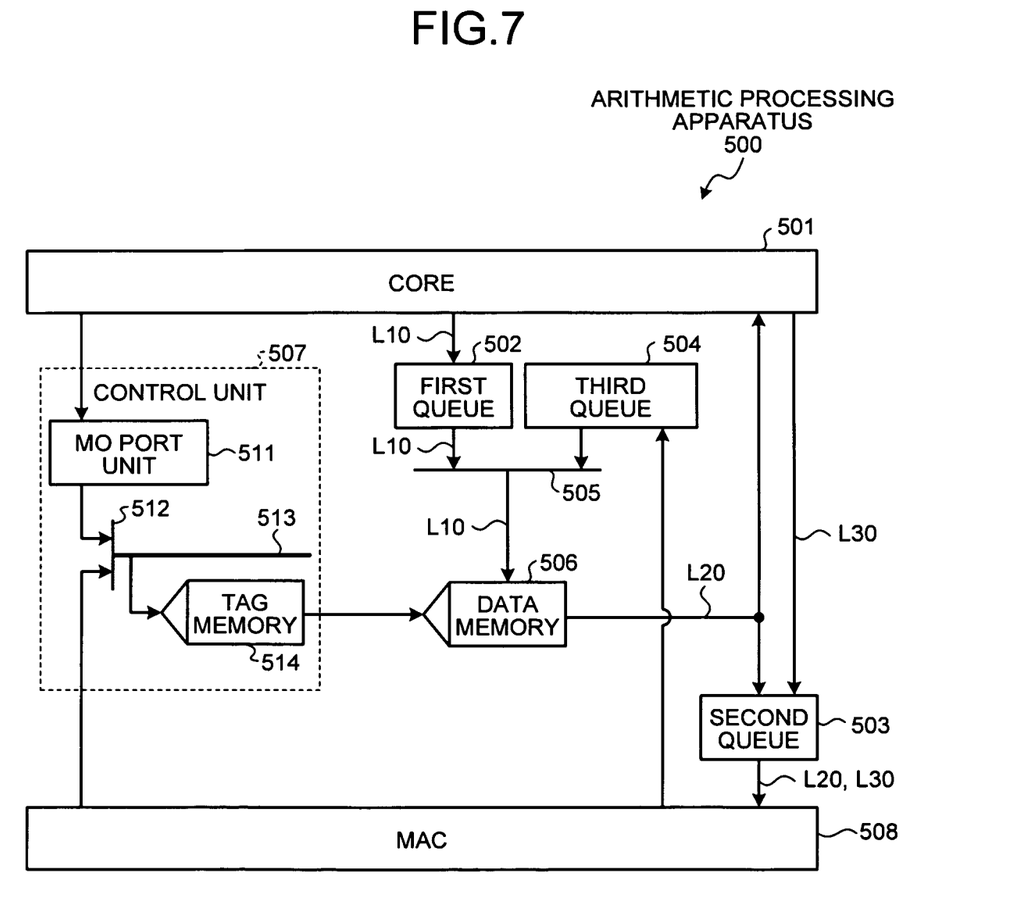
FIG. 7 is a diagram of an example of a conventional arithmetic processing apparatus.

In conventional arithmetic processing apparatuses, data that is processed through arithmetic processing by a processor core is temporarily stored in a cache memory and the data is written to a main storage unit at predetermined intervals of time. However, when data is written to the main storage unit via the cache memory, the time required for writing the data becomes accordingly longer (see, for example, Japanese Laid-open Patent Publication No. 63-20640). In order to improve the performance of arithmetic processing apparatuses by shortening the time necessary for writing data, arithmetic processing apparatuses are, in some cases, provided with a data path that directly connects a processor core and a main storage unit. FIG. 7 illustrates one example of an arithmetic processing apparatus that is provided with such a data path.

As illustrated in FIG. 7, an arithmetic processing apparatus 500 includes a processor core (hereinafter, "core") 501, a first queue, 502 a second queue 503, and a third queue 504. The arithmetic processing apparatus 500 further includes a selector 505, a data memory 506, a control unit 507, and a memory access controller (MAC) 508.

The core 501 is an arithmetic processing unit that executes various types of arithmetic processing using data that is stored in the data memory 506. The first queue 502 is a queue that temporarily stores data that is written back to the data memory 506 from the core 501. The second queue 503 is a queue that temporarily stores data that is written back to a main storage unit (not illustrated) from the data memory 506 via the MAC 508 when a cache replacement is performed. The third queue 504 is a queue that temporarily stores data that is transferred to the data memory 506 from the MAC 508 when a move in is performed on the occurrence of a cache miss.

The selector 505 selects any one of the data that is stored in the first queue 502 and the data that is stored in the third queue 504 and outputs the selected data to the data memory 506. The data memory 506 temporarily stores data that is frequently used by the core 501 and data that is processed by arithmetic processing in the core 501. The control unit 507 writes or reads data by pipeline processing according to instructions from the core 501. Specifically, the control unit 507 includes a move-out (MO) port unit 511, a priority unit 512, a pipeline 513, and a tag memory 514.

Order responses from the core 501, such as data writing and data reading, are set by the MO port unit 511. The priority unit 512 makes adjustments (data interference control) and inputs data to the pipeline 513. The tag memory 514 stores physical addresses of the data that is stored in the data memory 506 and stores logical addresses that are used for searching tags. When a data writing request is input from the priority unit 512, the pipeline 513 searches the tag memory 514 according to the logical address contained in the request and specifies the physical address of the data that is requested by the core 501. The MAC 508 is connected to the main storage unit (not illustrated) and writes data that is received from the second queue 503 to the main storage unit. If a cache miss occurs, for example, the MAC 508 receives the cache miss data from the main storage unit and transfers the cache miss data to the third queue 504.

In this case, if the latest data is stored in the data memory 506, a data path L20 from the data memory 506 to the MAC 508 is used to write the data to the main storage unit. For writing back data to the data memory 506 from the core 501, a data path L10 is used that extends from the core 501 to the data memory 506 via the first queue 502 and the selector 505.

If the latest data is stored in the core 501 and the data memory 506 stores only old data, a data path L30 for transferring data from the core 501 directly to the MAC 508 is used to write data to the MAC 508. Because a data path L30 that directly connects the core 501 and the MAC 508 is provided, the latest data that is stored in the core 501 can be quickly written to the main storage unit without going via the data memory 506.

However, newly providing a data path that directly connects a core and an MAC increases wiring costs. This is apparent particularly in a CPU including multiple cores and multi-bank storage units. These problems are specifically explained below.

Figure 8:
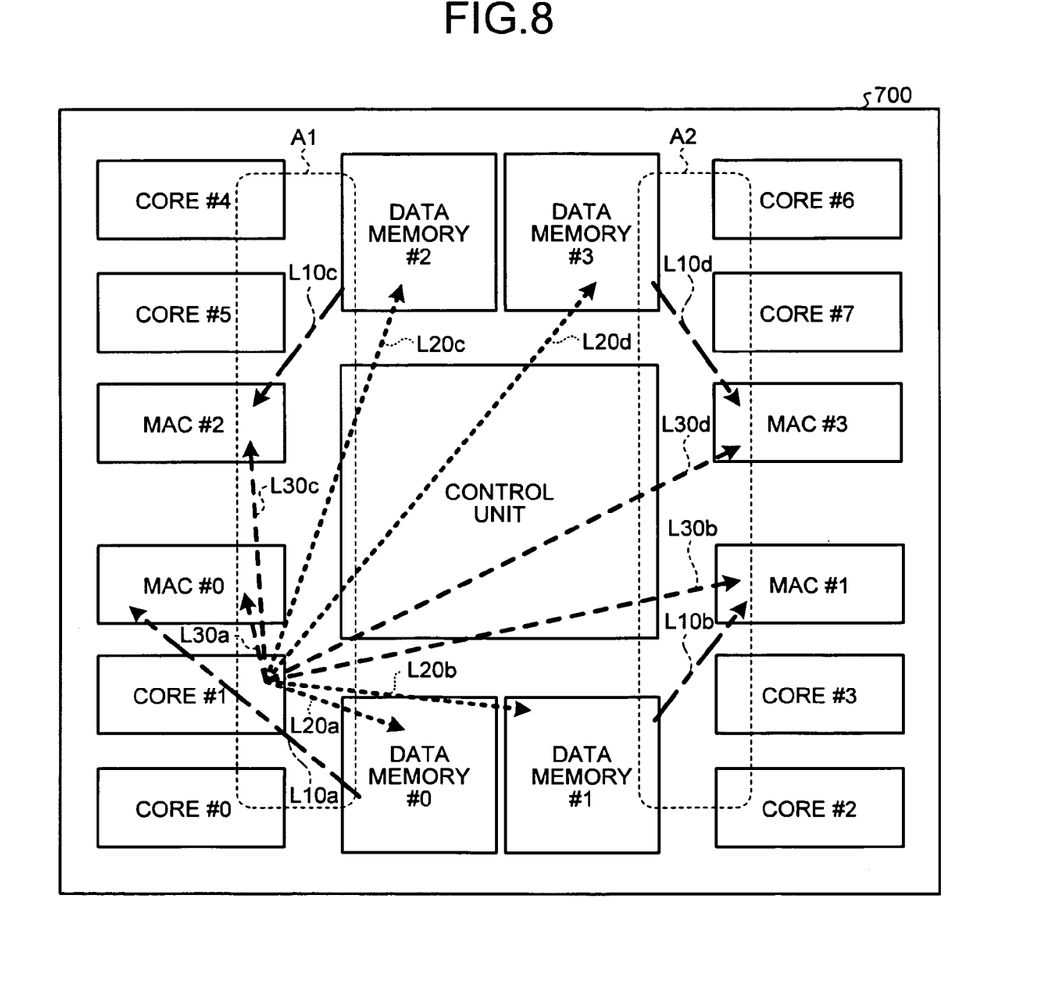
FIG. 8 is a diagram of a schematic configuration of a conventional CPU.

Increases in power consumption in recent single-core CPUs, each of which includes one core, is not ignorable and the performance improvement is approaching its limit. Approaches to further improve the CPU performance are made in some cases using a multi-core CPU that includes multiple cores on a board. Furthermore, in addition to providing multiple cores, approaches to improve the throughput between each core and the cache memory or the main storage unit are made in some cases by dividing the cache memory and the main storage unit into banks. FIG. 8 is a diagram of a schematic configuration of a conventional CPU.

As illustrated in FIG. 8, in a CPU 700 that includes multiple cores and multi-bank storage units, cores #0 to #7, data memories #0 to #3, and MACs #0 to #3 are arranged near the periphery of the board. At the center of the board, a control unit that controls the entire data transfer is located. Because the multi-bank main storage units respectively store different types of data, each of the cores #0 to #7 may write data to all of the MACs #0 to #3. Therefore, all the cores may be connected to all the MACs to provide data paths that directly connect the cores and the MACs, which increases wiring costs.

More specifically, in the CPU 700, a data path L30 that connects the cores and the MACs is provided between all of the cores #0 to #3 and all of the MACs #0 to #3. For example, as illustrated in FIG. 8, the core #1 is provided with data paths L30a to L30d that connect to the respective MACs #0 to #3. Note that the core #1 is further provided with data paths L20a to L20d that connect to the data memories #0 to #3, and the data memories #0 to #3 are provided respectively with data path L10a to L10d that connect to the corresponding MACs #0 to #3.

Among the data paths, particularly, the data path L30b and the data path L30d may be provided across the control unit that is located at the center of the board, which may increase wiring costs. Therefore, it has been difficult to mount a data path L30 that directly connects the cores and the MACs in the CPU 700, including the multiple cores and the multi-bank storage units. The areas A1 and A2, illustrated in FIG. 8, between the cores and the MACs and the data memories and the control unit are areas where wiring is particularly concentrated. Because providing the data path L30 in such areas results in an increase in the circuit size, mounting the data path is difficult.

SUMMARY

According to an aspect of an embodiment of the invention, a cache memory device includes: a data memory that stores data that is written by an arithmetic processing unit that performs arithmetic processing; a connecting unit that connects an input path from the arithmetic processing unit to the data memory and an output path from the data memory to a main storage unit; a selecting unit that is provided on the output path, selects any one of data that is output from the data memory or data that is transferred from the arithmetic processing unit via the connecting unit, and transfers the selected data to the output path; and a control unit that controls the selecting unit such that the data that is output from the data memory is transferred to the output path when the data is written from the data memory to the main storage unit, and controls the selecting unit such that the data is transferred to the output path via the connecting unit when the data is written from the arithmetic processing unit to the main storage unit.

According to another aspect of an embodiment of the invention, a processor includes: an arithmetic processing unit that performs arithmetic processing; a main storage control unit that is connected to a main storage unit and that controls accesses to the main storage unit; a data memory that is located between the arithmetic processing unit and the main storage unit, and that temporarily stores data that is written by the arithmetic processing unit; a connecting unit that connects an input path from the arithmetic processing unit to the data memory and an output path from the data memory to the main storage unit; a selecting unit that is provided on the output path, selects any one of data that is output from the data memory or data that is transferred from the arithmetic processing unit via the connecting unit, and transfers the selected data to the output path; and a control unit that controls the selecting unit such that the data that is output from the data memory is transferred to the output path when the data is written from the data memory to the main storage unit, and controls the selecting unit such that the data is transferred to the output path via the connecting unit when the data is written from the arithmetic processing unit to the main storage unit.

According to still another aspect of an embodiment of the invention, a processing method for a processor including an input path from an arithmetic processing unit to a data memory that stores data written by the arithmetic processing unit that performs arithmetic processing, and an output path from the data memory to a main storage unit, the processing method includes: selecting data that is output from the data memory when the data is written from the data memory to the main storage unit, and selecting the data that is transferred from the arithmetic processing unit via the input path when the data is written from the arithmetic processing unit to the main storage unit; and transferring the selected data to the main storage unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Embodiments of the present invention will be explained with reference to accompanying drawings. Note that the embodiments do not limit the present invention.

[a] First Embodiment

Figure 1:
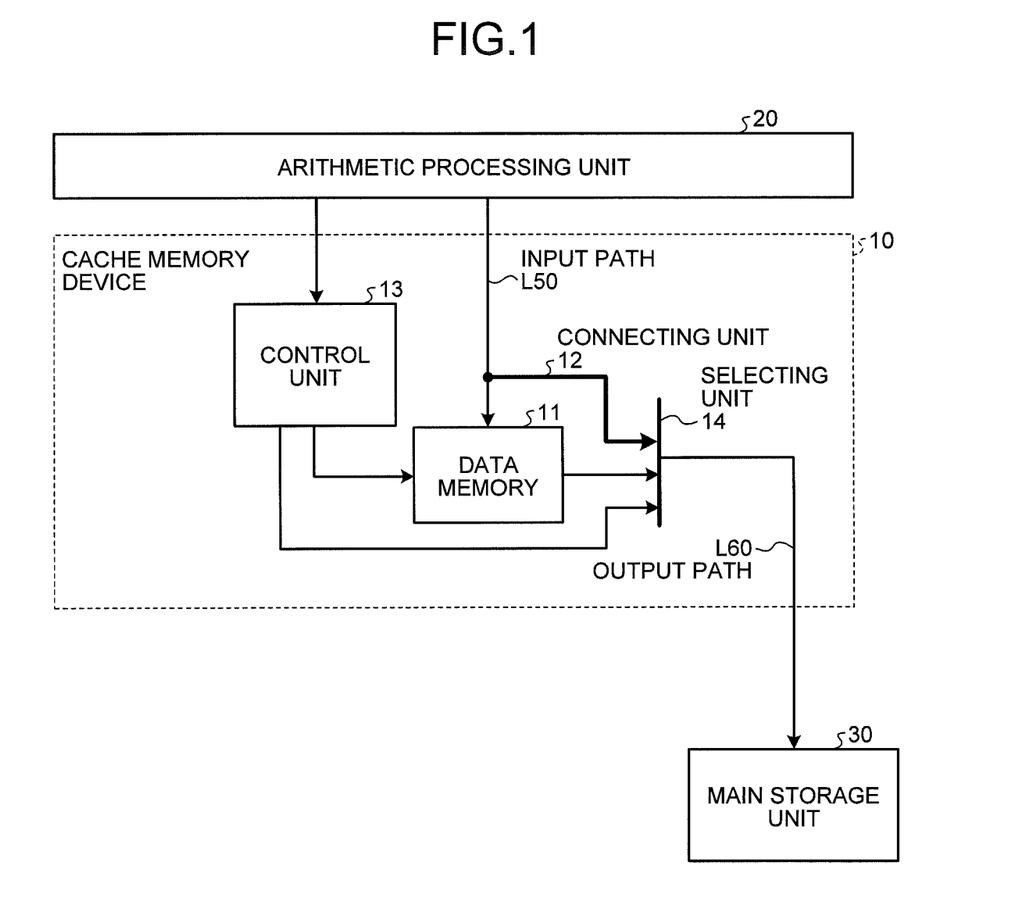
FIG. 1 is a diagram illustrating a connection relationship in a cache memory device according to a first embodiment of the present invention.

FIG. 1 is a diagram illustrating a connection relationship in a cache memory device according to a first embodiment of the present invention. A cache memory device 10 according to the first embodiment is a storage device that speeds up data communications between an arithmetic processing unit 20 and a main storage unit. As illustrated in FIG. 1, the cache memory device 10 is provided between the arithmetic processing unit 20 and a main storage unit 30. The main storage unit 30 is a storage unit that stores data. The arithmetic processing unit 20 performs various types of arithmetic processing using the data that is stored in the main storage unit 30.

The cache memory device 10 includes a data memory 11, a connecting unit 12, a control unit 13, and a selecting unit 14. The data memory 11 temporarily stores data on which the arithmetic processing is performed by the arithmetic processing unit 20. Specifically, the data memory 11 temporarily stores data that is transferred from the arithmetic processing unit 20 via an input path L50 as illustrated in FIG. 1.

The connecting unit 12 is wiring that connects the input path L50 from the arithmetic processing unit 20 to the data memory 11 and an output path L60 from the data memory 11 to the main storage unit 30. The selecting unit 14 is provided on the output path L60. Under the control of the control unit 13, the selecting unit 14 selects any one of the data that is output from the data memory 11 and the data that is transferred from the arithmetic processing unit 20 via the connecting unit 12, and transfers the selected data to the main storage unit 30.

In other words, to write the data stored in the data memory 11 to the main storage unit 30, the control unit 13 controls the selecting unit 14 and causes the selecting unit 14 to select the data that is output from the data memory 11. The selecting unit 14 then transfers the selected data to the main storage unit 30 via the output path L60.

In contrast, to write the data from the arithmetic processing unit 20 directly to the main storage unit 30, the control unit 13 controls the selecting unit 14 and causes the data to be transferred to the selecting unit 14 via the connecting unit 12. The selecting unit 14 then transfers the data to the main storage unit 30 via the output path L60. In this manner, the data on which the arithmetic processing is performed by the arithmetic processing unit 20 is written to the main storage unit 30 via the arithmetic processing unit 20, the input path L50, the connecting unit 12, the selecting unit 14, and the output path L60.

As described above, in the first embodiment, because the path for writing data from the arithmetic processing unit 20 directly to the main storage unit 30, avoiding the data memory 11, is provided, the time required for writing data from the arithmetic processing unit 20 to the main storage unit 30 can be shortened. Furthermore, because the data path can be provided utilizing the input path L50 from the arithmetic processing unit 20 to the data memory 11 and the output path L60 from the data memory 11 to the main storage unit 30, wiring costs can be reduced.

In the first embodiment, wiring costs are reduced and the time necessary for writing data from the arithmetic processing unit 20 to the main storage unit 30 can be shortened.

[b] Second Embodiment

A cache memory device, a semiconductor integrated circuit, and an arithmetic processing apparatus according to a second embodiment of the present invention will be explained. As an example of the semiconductor integrated circuit, a CPU in which a plurality of cores, a plurality of memories, and a plurality of MACs are arranged is used for explanation. Note that the technology disclosed in this application can be applied to a CPU in which a core, a data memory, and a MAC are arranged on a single board.

Figure 2:
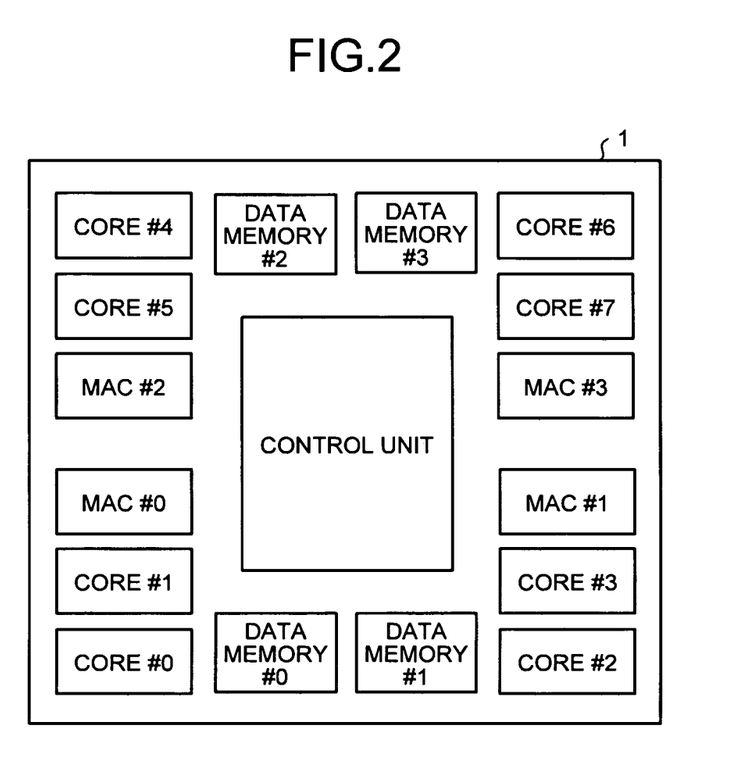
FIG. 2 is a diagram of a schematic configuration of a CPU according to a second embodiment of the present invention.

FIG. 2 is a diagram of a schematic configuration of the CPU according to the second embodiment. As illustrated in FIG. 2, a CPU 1 is a semiconductor integrated circuit that includes eight cores #0 to #7, four data memories #0 to #3, four MACs #0 to #3, and a control unit. In the CPU 1, the cores #0 to #7, the data memories #0 to #3, and the MACs #0 to #3 are arranged near the periphery of a board, and the control unit is located at the center of the board.

The cores #0 to #7 are arithmetic processing units that receive data that is temporarily stored in the data memories #0 to #3 and performs various types of arithmetic processing on the data. For example, the data on which the arithmetic processing is performed by the cores #0 to #7 is temporarily stored in storage units (not illustrated) (hereinafter, "primary cache") that are respectively provided in the cores #0 to #7 or stored in the data memories #0 to #3. The cores #0 to #7 issue, to the control unit, instructions for writing the data that is stored in the primary caches or the data that is stored in the data memories #0 to #3 on a main storage unit (not illustrated).

The data memories #0 to #3 temporarily store data that the cores #0 to #7 frequently use and the data on which the arithmetic processing is performed by the cores #0 to #7. Specifically, when the control unit performs a write-back process, the data memories #0 to #3 receive the data that is stored in the primary caches of the cores #0 to #7 and stores the received data. When the control unit performs a data-write process, the data memories #0 to #3 output the data stored therein to the MACs #0 to #3.

The MACs #0 to #3 are main storage control devices that connect to the main storage unit (not illustrated) and that control accesses to the main storage unit. Specifically, the MACs #0 to #3 receive data from the data memories #0 to #3 and write the data to the main storage unit.

The control unit performs the data-write process or the write-back process by pipeline processing. The data-write process is a process for writing back the latest data that is stored in the primary caches of the cores #0 to #7 to the main storage unit, or for writing back the data that is stored in the data memories #0 to #3 to the main storage unit. The write-back process is a process for writing back the data that is stored in the primary caches of the cores #0 to #7 to the data memories #0 to #3.

Figure 3:
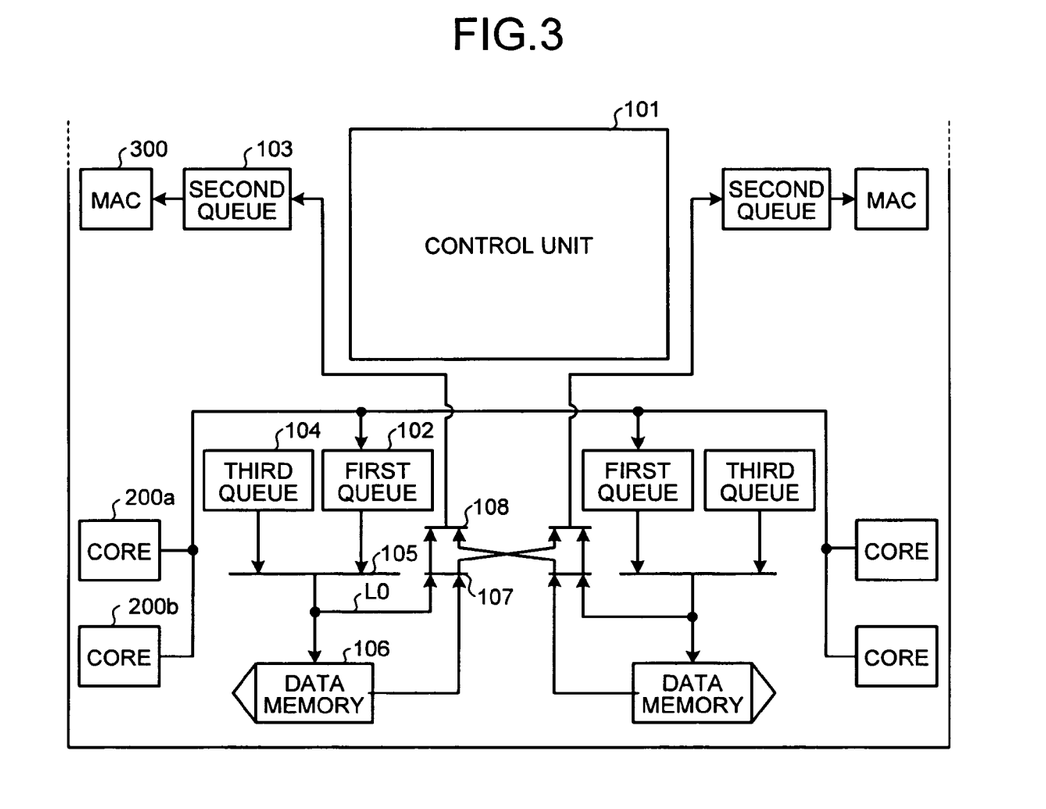
FIG. 3 is a diagram of a main configuration of the CPU according to the second embodiment of the present invention.

FIG. 3 is a diagram of a main configuration of the CPU 1 according to the second embodiment. FIG. 3 particularly illustrates the parts corresponding to the cores #0 to #3, the data memories #0 and #1, and the MACs #0 and #1 of the CPU 1 illustrated in FIG. 2.

The CPU 1 illustrated in FIG. 3 includes a control unit 101, a first queue 102, a second queue 103, a third queue 104, a selector 105, a data memory 106, selectors 107 and 108, and a connecting unit L0. The CPU 1 further includes cores 200*a* and 200*b* and an MAC 300. Because the CPU 1 illustrated in FIG. 3 has a symmetrical configuration, reference numerals are given to only the left half of the diagram.

The cores 200*a* and 200*b* perform various types of arithmetic processing using the data that is stored in the main storage unit (not illustrated) connected to the MAC 300, or the data that is stored in the data memory 106. For example, the cores 200*a* and 200*b* issue a request for data to be used for arithmetic processing to the control unit 101. When the data is stored in the data memory 106 (cache hit), the cores 200*a* and 200*b* read the data from the data memory 106 by a data-read process. In contrast, when the data to be used for the arithmetic processing is not stored in the data memory 106 (cache miss), the cores 200*a* and 200*b* transfer the data from the main storage unit to the data memory 106 via the MAC 300 and the third queue 104, and then receive the data from the data memory 106.

After the cores 200*a* and 200*b* complete the arithmetic processing, the cores 200*a* and 200*b* store the data that is processed by the arithmetic processing in the primary caches (not illustrated) of the cores 200*a* and 200*b*. The cores 200*a* and 200*b* then issue, to the control unit 101, an instruction for performing the data-write process for writing data to the main storage unit. Specifically, the cores 200*a* and 200*b* according to the second embodiment issue an instruction for performing the data-write process for writing the data stored in the primary caches directly to the main storage unit, in addition to the instruction for performing the existing data-write process for writing the data stored in the primary caches to the main storage unit via the data memory.

The control unit 101 performs the write-back process and the data-write process according to instructions from the cores 200*a* and 200*b*. In addition to these processes, the control unit 101 also performs the data-read process for reading data that is requested by the cores 200*a* and 200*b* from the data memory 106 and a move-in process for transferring data requested by the cores 200*a* and 200*b* from the main storage unit to the data memory when a cache miss occurs.

When inputting instructions, such as the data-write request or the write-back request from the cores 200a and 200b, to the pipeline, the control unit 101 inputs the instructions to the pipeline at appropriate intervals such that a plurality of instructions do not cause interference that simultaneously uses resources, such as the data memory 106. This will be described below.

The first queue 102 is a queue that temporarily stores the data that is to be written back from the cores 200a and 200b to the data memory 106 when the write-back process is performed. Specifically, the first queue 102 temporarily stores the data that is processed by the arithmetic processing in the cores 200a and 200b, and outputs the data under the control of the control unit 101. The first queue 102 is provided near the input part of the data memory 106 in consideration of wiring. The first queue 102 may be referred to as, for example, a write back data queue (WBDQ).

The second queue 103 is a queue that temporarily stores the data that is to be written back from the data memory 106 to the main storage unit (not illustrated) via the MAC 300 when the data-write process is performed. Specifically, the second queue 103 temporarily stores the data that is received via the selector 108, and outputs the data to the MAC 300 under the control of the control unit 101. The second queue 103 is provided near the MAC 300 in consideration of wiring. The second queue 103 may be referred to as, for example, a move out data queue (MODQ).

The third queue 104 is a queue that temporarily stores the data that is to be transferred from the MAC 300 to the data memory 106 when the move-in process is performed on the occurrence of a cache miss. Specifically, the third queue 104 temporarily stores the data from the MAC 300, which data is requested by the cores 200a and 200b, and outputs the data to the data memory 106 via the selector 105. The third queue 104 is provided near the input part of the data memory 106 in consideration of wiring as the first queue 102 is. The third queue 104 may be referred to as, for example, a move in data queue (MIDQ).

The selector 105 selects any one of the data that is stored in the first queue 102 and the data that is stored in the third queue 104, and outputs the data to the data memory 106. Specifically, when the control unit 101 performs the write-back process, the selector 105 selects the data stored in the first queue 102. When the control unit 101 performs the move-in process, the selector 105 selects the data stored in the third queue 104.

The data memory 106 temporarily stores the data that is used by the cores 200a and 200b and the data that is processed by the arithmetic processing in the cores 200a and 200b. Specifically, when the control unit 101 performs the write-back process, the data memory 106 receives the data that is output from the primary caches of the cores to the first queue 102, and stores the received data. When the control unit 101 performs the data-write process, the data memory 106 outputs the data, which is received from the first queue 102, to the selector 107. For example, a random access memory (RAM) may be used for the data memory 106.

The connecting unit L0 is wiring that connects the data path from the cores 200a and 200b to the data memory 106 (hereinafter, "input path") and the data path from the data memory 106 to the MAC 300 (hereinafter, "output path"). Specifically, the connecting unit L0 connects the input path between the first queue 102 and the data memory 106 and the selector 107. In other words, the connecting unit L0 connects to the input path near the data memory 106.

The connecting unit L0 transfers the data that is output from the first queue 102 to the selector 107, avoiding the data memory 106. In other words, because the connecting unit L0 is provided, the CPU 1 according to the second embodiment can output the data that is output from the first queue 102 directly to the MAC 300 without going via the data memory 106.

The selector 107 is a selecting unit that is provided on the output path of the data memory 106. The selector 107 selects any one of the data that is output from the first queue 102 via the connecting unit L0 and the data that is output from the data memory 106, and outputs the data to the selector 108. Specifically, when data is transferred from the cores 200a and 200b directly to the MAC 300, the selector 107 transfers the data, which is output from the first queue 102, to the selector 108 via the connecting unit L0 under the control of the control unit 101. When data that is stored in the data memory 106 is transferred directly to the MAC 300, the selector 107 transfers the data, which is output from the data memory 106, to the selector 108 under the control of the control unit 101.

The selector 108 selects any one of the data that is output from the selector 107 and data that is output from another selector corresponding to the selector 107, and outputs the data to the MAC 300. Specifically, when the data that is stored in the cores 200a and 200b or the data memory 106 is transferred to the MAC 300, the selector 108 selects the data that is output from the selector 107. In contrast, when data that is stored in a core other than the cores 200a and 200b or in a data memory other than the data memory 106 is transferred to the MAC 300, the selector 108 selects the data that is output from another selector corresponding to the selector 107.

The MAC 300 is connected to the main storage unit (not illustrated) that stores all data that the cores 200a and 200b may use, and controls accesses to the main control unit. Specifically, the MAC 300 writes the data, which is stored in the second queue 103, to the main storage unit. Note that, as another process, when a cache miss occurs, the MAC 300 receives the cache miss data and then transfers the data to the third queue 104.

Figure 4:
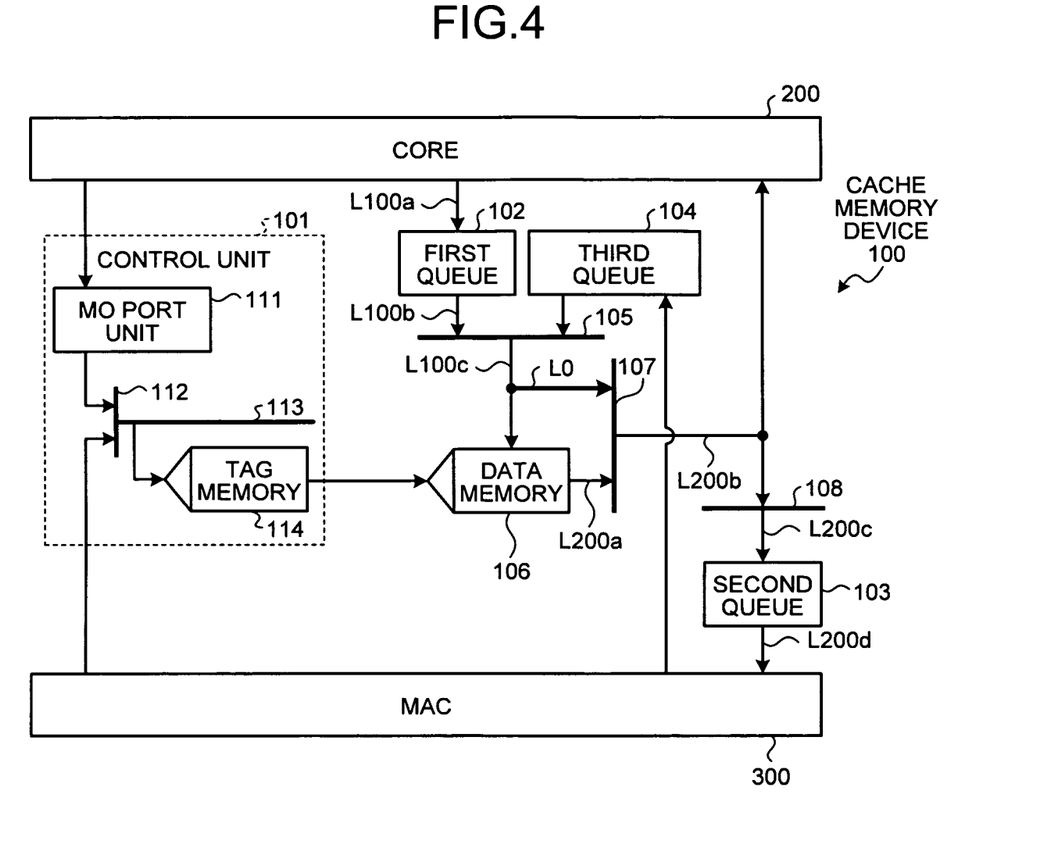
FIG. 4 is a diagram illustrating a connection relationship in a cache memory device according to the second embodiment of the present invention.

Subsequently, the connection relationship between the cores, the MACs, and the cache memory device according to the second embodiment will be explained in detail with reference to FIG. 4. FIG. 4 is a diagram illustrating the connection relationship in the cache memory device according to the second embodiment. The same parts in FIG. 4 as those in FIG. 2 are denoted by the same reference numerals and explanation thereof will be omitted.

As illustrated in FIG. 4, a cache memory device 100 includes the control unit 101, the first queue 102, the second queue 103, the third queue 104, the selectors 105, 107, and 108, and the data memory 106.

The control unit 101 performs the write-back process and the data-write process according to a data-write request from a core 200. Specifically, the control unit 101 includes an MO port unit 111, a priority unit 112, a pipeline 113, and a tag memory 114. The MO port unit 111 receives instructions, such as the data-write request, from the core 200. In the second embodiment, the data-write request include, in addition to the existing data-write request for writing data via the data memory 106, a data-write request for writing data that is stored in the primary cache of the core 200 directly to the main storage unit. When the data stored in the primary cache is transferred directly to the MAC 300, the core 200 outputs a movement bypass and tag invalidate (MB-IV) to the MO port unit 111 as the data-write request.

The priority unit 112 adjusts instructions that are received by the MO port unit 111 in consideration of priority in data paths and various resources, and inputs the instructions to the pipeline 113. Specifically, when the MO port unit 111 receives the MB-IV, the priority unit 112 generates a bypass moveout (BPMO) as internal operation codes and inputs the BPMO to the pipeline 113. A buffer (not illustrated) that stores a move-in request, which is issued on the occurrence of a cache miss, is provided between the MAC 300 and the priority unit 112. The priority unit 112 also adjusts the move-in request that is stored in the buffer. The buffer may be referred to as, for example, a move-in (MI) buffer.

The tag memory 114 stores the physical addresses and type codes of the data that is stored in the data memory 106 and stores logical addresses that are used for local buffer storage tag (LBSTAG) search. The pipeline 113 searches the tag memory 114 according to instructions that are input from the priority unit 112 and specifies the physical address of the data. The pipeline 113 updates or transfers the data that is stored in the specified physical address according to the input instructions.

Upon receiving the existing data-write request from the core 200, first, as the write-back process, the control unit 101 writes the data that is stored in the primary cache of the core 200 to the data memory 106 using input paths L100a to L100c.

In other words, the data stored in the primary cache of the core 200 is first transferred to the first queue 102 from the core 200 via the input path L100a. Subsequently, the data stored in the first queue 102 is transferred to the selector 105 via the input path L100b. At this stage, under the control of the control unit 101, the selector 105 selects the data from the input path L100b and transfers the data to the data memory 106 via the input path L100c. The data memory 106 receives the data that is transferred via the input path L100c, i.e., the data that is stored in the primary cache of the core 200, and stores the data. Accordingly, the write-back process completes.

Subsequently, as the data-write process, the control unit 101 transfers the data that is stored in the data memory 106 to the MAC 300 using the output paths L200a to L200d. In other words, the data that is stored in the data memory 106 is first transferred to the selector 107 via the output path L200a. Subsequently, under the control of the control unit 101, the selector 107 selects the data from the output path L200a and transfers the data to the second queue 103 via the output path L200b, the selector 108, and the output path L200c. The data that is stored in the second queue 103 is then transferred to the MAC 300 via the output path L200d and written back by the MAC 300 to the main storage unit. Accordingly, the data stored in the main storage unit becomes the latest, which maintains the data coherency (cache coherency).

The selector 107 is provided near the data memory. In other words, the connecting unit L0 that connects the input path L100c and the selector 107 is a very short line that is provided to only around the data memory 106. By providing the connection unit L0 in a short length only around the data memory 106, an increase in wiring costs can be further reduced and effects on the neighboring wiring can also be reduced.

Assume that a data-write request for writing data from the core 200 directly to the main storage unit is received from the core 200, i.e., the control unit 101 receives at the MO port unit 111 the MB-IV as the data-write request from the core 200. In this case, the control unit 101 transfers the data that is stored in the primary cache of the core 200 directly to the MAC 300, using the connecting unit L0. Specifically, this data transfer is performed when the data is exclusively stored, the latest data is stored in the primary cache of the core 200, and only old data is stored in the data memory 106.

In other words, the data that is stored in the primary cache of the core 200 is first transferred from the core 200 to the first queue 102 via the input path L100a. Subsequently, under the control of the control unit 101, the data that is stored in the first queue 102 is transferred to the selector 105 via the input path L100b. Subsequently, under the control of the control unit 101, the selector 105 selects the data from the input path L100b and transfers the selected data to the input path L100c.

Under the control of the control unit 101, the selector 107 then receives the data that is output from the selector 105 via an input path 100c and the connecting unit L0, and transfers the data to the second queue 103 via the output path L200b, the selector 108, and the output path L200c. The following steps are similar to those performed when the latest data is stored in the data memory 106, i.e., the MAC 300 writes back the data, which is stored in the second queue 103, to the main storage unit and the data-write process is completed accordingly.

As described above, in the second embodiment, by providing the data paths for writing data that is processed by the arithmetic processing in the core 200 directly to the main storage unit (not illustrated), avoiding the data memory 106, the time required for writing the data from the core 200 to the main storage unit can be shortened. Furthermore, the data paths utilize the input paths L100a to L100c that are used for performing the write-back process and the output paths L200b to L200d that are used for performing the process for writing data from the data memory 106 to the main storage unit. This reduces wiring costs and allows easily mounting the data paths on the CPU 1 that includes the multiple cores and multi-bank memories.

In the second embodiment, the input paths L100a to L100c are used commonly to write back data from the core 200 to the data memory 106 and to write data from the core 200 to the main storage unit via the connecting unit L0. Similarly, the output paths L200b to L200d are used commonly to write data from the core 200 to the main storage unit via the connecting unit L0 and to write data stored in the data memory 106 to the main storage unit. Therefore, when another process is performed while each of the above processes is performed, data interference may occur.

Figure 5:
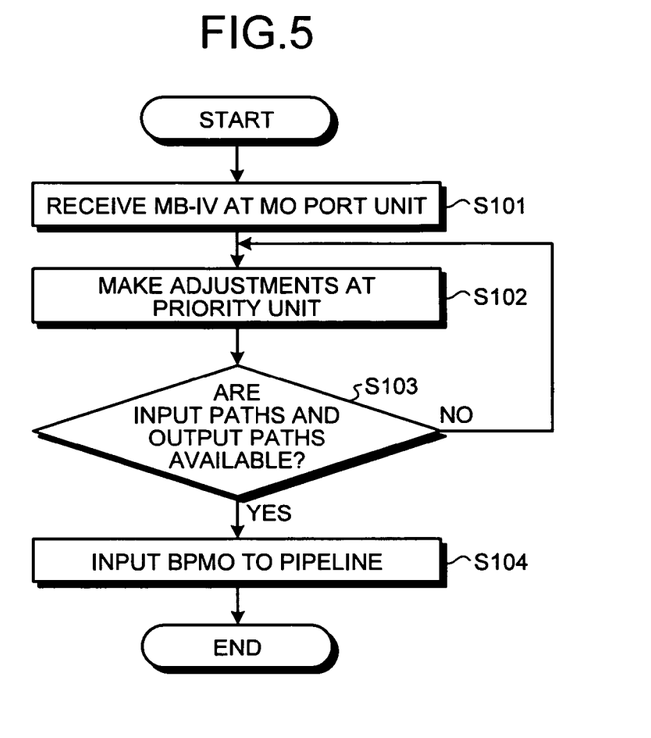
FIG. 5 is a flowchart of a process procedure of a control unit according to the second embodiment.

To prevent occurrence of data interference in consideration of resources and data paths that are used for sequential requests, the control unit 101 according to the second embodiment performs data interference control. Specifically, upon receiving an instruction, such as the data-write requests, from the core 200, the priority unit 112 inputs the instruction to the pipeline at an appropriate interval. Specific operations of the control unit 101 according to the second embodiment will be explained. FIG. 5 is a flowchart of a process procedure of the control unit 101 according to the second embodiment. FIG. 5 illustrates only a process procedure, among process procedures performed by the control unit 101, of the data-write process for directly transferring data that is stored in the primary cache of the core 200 directly to the MAC 300.

As illustrated in FIG. 5, the control unit 101 first receives, at the MO port unit 111, the MB-IV that requests transferring the data that is stored in the primary cache memory of the core 200 directly to the MAC 300 (step S101). The control unit 101 then makes adjustments, at the priority unit 112, such that no data interference between instructions occurs (step S102).

The control unit 101 determines, at the priority unit 112, whether the input paths L100a to L100c and the output paths L200a to L200d are available (step S103). In other words, the priority unit 112 determines whether the input paths L100a to L100c are being used because of the write-back process, and whether the output paths L200a to L200d are being used because of the process for writing data from the data memory 106. When the input paths L100a to L100c and the output paths L200a to L200d are not being used, the control unit 101 determines that the input paths L100a to L100c and the output paths L200a to L200d are available.

In this process, when the input paths L100a to L100c and the output paths L200a to L200d are not available (NO at step S103), the priority unit 112 makes adjustments such that the MB-IV waits in the MO port unit 111 until these paths become available. In other words, in the second embodiment, when the input paths L100a to L100c are being used because of the write-back process or when the output paths L200a to L200d are being used because of the process for writing data from the data memory 106, the data is not transferred from the core 200 directly to the MAC 300.

When it is determined that the input paths L100a to L100c and the output paths L200a to L200d are available (YES at step S103), the priority unit 112 generates an internal operation code BPMO and inputs the BMPO to the pipeline (step S104). The conditions for the control unit 101 to determine that the input paths L100a to L100c and the output paths L200a to L200d are available include the case where the time at which the waiting instruction starts to be executed.

Accordingly, the latest data that is stored in the primary cache of the core 200 is output to the first queue 102. The latest data that is stored in the first queue 102 is then transferred via the selector 105 to the input paths L100c. Under the control of the control unit 101, the selector 107 receives the data that is output from the selector 105 via the input path 100c and the connecting unit L0, and transfers the data to the output path L200b. As a result, the latest data is transferred to the second queue 103 via the output path L200b, the selector 108, and the output path L200c, and is written back by the MAC 300 to the main storage unit.

As described above, when the control unit 101 receives the data-write instruction for writing the data from the core 200 to the main storage unit and the input paths L100a to L100c or the output paths L200a to L200d are being used because of the process according to another instruction, the control unit 101 waits starting to perform the process according to the data-write instruction until the use of the paths completes. In other words, the control unit 101 inputs the BPMO to the pipeline 113 under the condition that the input paths L100a to L100c and the output paths L200a to L200d are not being used. Accordingly, occurrence of data interference between the write-back process and the process for writing data from the data memory 106 can be prevented.

While performing the data-write process for writing the data from the core 200 to the main storage unit, the control unit 101 waits for starting to perform a process, such as the write-back process or the move-in process, that uses the input paths. Furthermore, while performing the process for writing the data from the core 200 to the main storage unit, the control unit 101 waits for starting to perform a process, such as writing data from the data memory 106 to the main storage unit, using the output paths.

When the process for writing the data from the core 200 to the main storage unit is completed and the time at which the waiting instruction starts to be executed, the control unit 101 inputs the instruction to the pipeline to start performing the process according to the instruction. Because, in this manner, the control unit 101 waits for starting to perform another process using the input paths or the output paths while performing the data-write process for writing the data from the core 200 to the main storage unit, data interference can be prevented more assuredly.

When performing the process for writing data from the data memory 106, the control unit 101 controls the selector 107 such that it selects the data from the output path L200a. Accordingly, the latest data is transferred from the data memory 106 via the output path L200a to the selector 107. The latest data is then transferred to the second queue 103 via the output path L200b, the selector 108, and the output path L200c, and is written back by the MAC 300 to the main storage unit.

As described above, in the second embodiment, provision of the data paths for directly writing the data that is processed by the arithmetic processing in the core 200 directly to the main storage unit (not illustrated), avoiding the data memory 106, shortens the time required for writing the data from the core 200 to the main storage unit. Furthermore, in the second embodiment, because the data paths are formed by utilizing the data paths that are used for the write-back process and the process for writing the data from the data memory 106 to the main storage unit, the wiring cost can be reduced and the data paths may be mounted easily on the CPU that includes the multiple cores and the multi-bank storage units.

Specifically, in the second embodiment, with a small increase in physical costs because of adding the connecting unit L0 and the selector 107, higher physical costs for assuring the data paths that directly connect each core 200 and each MAC 300 as in the conventional technologies can be reduced. Furthermore, in the second embodiment, only the connecting unit L0 provided in a short line and the selector 107 are added and they can be easily provided in an area in a CPU where wiring is concentrated. Accordingly, an increase in the circuit size can be reduced, which is highly efficient regarding the number of transistors to be mounted and wiring. Thus, the data paths for transferring data from the core 200 directly to the MAC 300 can be mounted on the CPU that includes multiple cores 200 and the MAC 300.

Furthermore, for controlling the process for writing data from the core 200 to the main storage unit, the steps in which the control unit 101 controls the selector 107 are only added to the existing steps using the steps of the write-back process and the process for writing data from the data memory 106 to the main storage unit. Therefore, the control complexity can be reduced. This reduces effects on the performance as a CPU.

Figure 6:
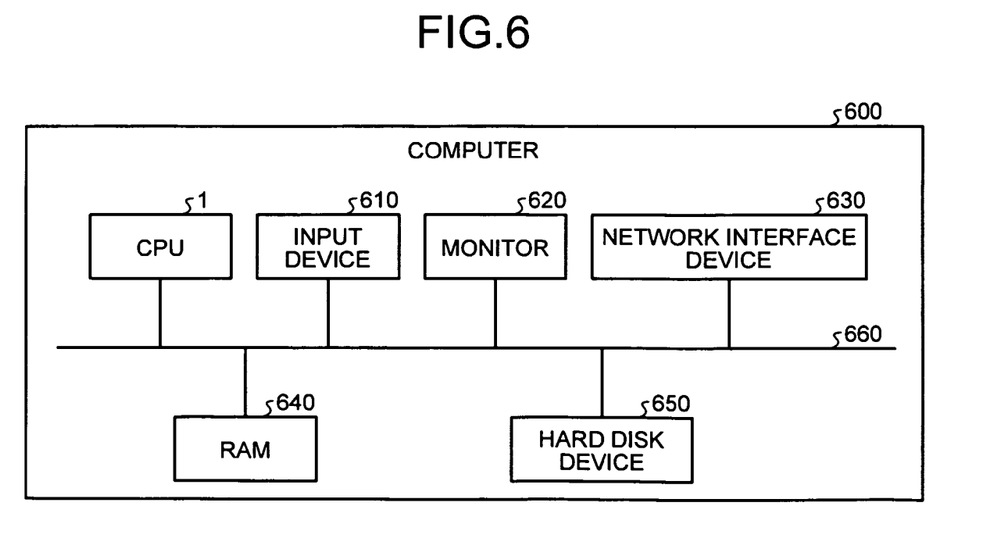
FIG. 6 is a block diagram of an example of a computer that mounts the CPU according to the second embodiment.

The CPU 1 according to the second embodiment is mounted on an arithmetic processing apparatus, such as a personal computer (PC). FIG. 6 is a block diagram of an example of a computer on which the CPU 1 according to the second embodiment is mounted.

As illustrated in FIG. 6, a computer 600 that is an arithmetic processing apparatus includes the CPU 1, an input device 610, a monitor 620, a network interface device 630, a RAM 640, and a hard disk device 650. The computer 600 connects these devices with a bus 660.

The input device 610 is for example a keyboard and a mouse, and receives data inputs from users. The monitor 620 is a display unit that displays various types of information. The network interface device 630 communicates data with other computers via networks, such as the Internet. The RAM 640 corresponds to the main storage unit and temporarily stores various types of information. The hard disk device 650 is a non-volatile storage device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A cache memory device comprising:
a data memory that stores data that is written by an arithmetic processing unit that performs arithmetic processing;
a connecting unit that connects an input path from the arithmetic processing unit to the data memory and an output path from the data memory to a main storage unit;
a selecting unit that is provided on the output path, selects any one of data that is output from the data memory or data that is transferred from the arithmetic processing unit via the connecting unit, and transfers the selected data to the output path; and
a control unit that controls the selecting unit such that the data that is output from the data memory is transferred to the output path when the data is written from the data memory to the main storage unit, and controls the selecting unit such that the data is transferred to the output path via the connecting unit when the data is written from the arithmetic processing unit to the main storage unit.

2. The cache memory device according to claim 1, wherein, when the control unit receives a data-write instruction for writing data from the arithmetic processing unit to the main storage unit and the input path or the output path is being used because of a process according to another instruction, the control unit waits for starting to perform a process according to the data-write instruction until use of the input path or the output path completes.

3. The cache memory device according to claim 2, wherein, when a time at which the waited instruction starts to be executed comes, the control unit inputs the instruction to a pipeline to start performing the process according to the instruction.

4. The cache memory device according to claim 1, wherein, while performing a data-write process for writing data from the arithmetic processing unit to the main storage unit, the control unit waits for starting to perform another process that uses the input path.

5. The cache memory device according to claim 4, wherein, when a time at which the waited instruction starts to be executed comes, the control unit inputs the instruction to a pipeline to start performing the process according to the instruction.

6. The cache memory device according to claim 1, wherein, while performing a data-write process for writing data from the arithmetic processing unit to the main storage unit, the control unit waits for starting to perform another process that uses the output path.

7. The cache memory device according to claim 6, wherein, when a time at which the waited instruction starts to be executed comes, the control unit inputs the instruction to a pipeline to start performing the process according to the instruction.

8. The cache memory device according to claim 1 further comprising a queue that is provided on the input path and that temporarily stores data to be written from the arithmetic processing unit to the data memory or to the main storage unit;
wherein the control unit controls the selecting unit such that the data that is output from the queue is transferred via the connecting unit to the output path.

9. The cache memory device according to claim 1, wherein the connecting unit is connected to the input path near the data memory.

10. The cache memory device according to claim 1, wherein the selecting unit is provided near the data memory.

11. A processor comprising:
an arithmetic processing unit that performs arithmetic processing;
a main storage control unit that is connected to a main storage unit and that controls accesses to the main storage unit;
a data memory that is located between the arithmetic processing unit and the main storage unit, and that temporarily stores data that is written by the arithmetic processing unit;
a connecting unit that connects an input path from the arithmetic processing unit to the data memory and an output path from the data memory to the main storage unit;
a selecting unit that is provided on the output path, selects any one of data that is output from the data memory or data that is transferred from the arithmetic processing unit via the connecting unit, and transfers the selected data to the output path; and
a control unit that controls the selecting unit such that the data that is output from the data memory is transferred to the output path when the data is written from the data memory to the main storage unit, and controls the selecting unit such that the data is transferred to the output path via the connecting unit when the data is written from the arithmetic processing unit to the main storage unit.

12. A processing method for a processor including an input path from an arithmetic processing unit to a data memory that stores data written by the arithmetic processing unit that performs arithmetic processing, and an output path from the data memory to a main storage unit, the processing method comprising:
selecting data that is output from the data memory when the data is written from the data memory to the main storage unit, and selecting the data that is transferred from the arithmetic processing unit via the input path when the data is written from the arithmetic processing unit to the main storage unit; and
transferring the selected data to the main storage unit.

* * * * *